United States Patent [19]

Termini

[11] Patent Number: 5,718,163
[45] Date of Patent: Feb. 17, 1998

[54] ELECTRONIC APPARATUS FOR COFFEE GRINDING AND METERING CONTROL

[75] Inventor: Nunzio Termini, Palermo, Italy

[73] Assignee: Il Caffe' Del Professore S.r.l., Palermo, Italy

[21] Appl. No.: 726,492

[22] Filed: Oct. 7, 1996

[30] Foreign Application Priority Data

Oct. 5, 1995 [IT] Italy .................. MI95U0677

[51] Int. Cl.⁶ .................................. B02C 25/00
[52] U.S. Cl. .................. 99/286; 99/289 R; 241/34; 241/36
[58] Field of Search ............... 99/286, 287, 510, 99/348, 289 R; 241/33, 34, 35, 36; 366/601

[56] References Cited

U.S. PATENT DOCUMENTS

5,186,399  2/1993  Knepler et al. ............. 241/34

FOREIGN PATENT DOCUMENTS

0178013  4/1986  European Pat. Off. .
0504539  9/1992  European Pat. Off. .

OTHER PUBLICATIONS

Patent Abstracts of Japan, vol. 14, No. 508, JP-A-02 212901, (Matsushita Electric Ind Co Ltd), Aug. 24, 1990.
Patent Abstracts of Japan, vol. 18, No. 189, JP-A-06 000128, (Matsushita Electric Ind Co Ltd), Jan. 11, 1994.

*Primary Examiner*—Reginald L. Alexander
*Attorney, Agent, or Firm*—Jacobson, Price, Holman & Stern, PLLC

[57] ABSTRACT

The present invention relates to an electronic apparatus for controlling coffee grinding and metering, of the type containing, within an encasing structure (10), a plurality of disposable coffee containers (4, 4'), means (30, 40) for coffee grinding regulation, metering means (80, 90), means (84, 84') for filtering and dispensing coffee doses and means (51, 51A) which enable the whole apparatus in the presence of elements of recognition of the quality of used coffee, said elements being stored on storage supports of magnetic (5') and/or electronic (5) type. The coffee grinding unit (1) comprises at least one electronic control card (51, 51A) which enables said coffee grinding regulation means (30, 40) as a function of their consumption over time and of the quality of used coffee, for a sufficient and necessary number of times for consuming that amount of coffee which is present inside said containers (4, 4').

20 Claims, 5 Drawing Sheets

ELECTRONIC APPARATUS FOR COFFEE GRINDING AND METERING CONTROL

FIELD OF THE INVENTION

The present invention relates to an electronic apparatus for controlling coffee grinding and metering.

DESCRIPTION OF RELATED ART

Apparatuses for grinding, metering and dispensing coffee equipped with containers to which coffee can be added when missing, are known.

Said apparatuses comprise grinding means connected with a metering means which delivers predetermined coffee doses to the dispensing filters. Such apparatuses must be charged by the attending operator when so necessary; furthermore, the same operator must manually adjust a device installed on the front panel of the apparatus in order to change coffee grinding degree as a function of the quality of the blend, and of the roating degree. Clearly, under such conditions, one must rely upon the discretion of the operator.

Other known coffee grinding and metering apparatuses are designed in order to guarantee the quality of coffee produced by them. These machines use mutual recognition means like probes, bar codes, electrical capacitor-inductor filters, electronic filters between coffee container and the relevant housing, present inside the apparatus.

In this case, the exclusive use is secured of a certain coffee quality preselected by the manufacturer and the consumer, whereas the regulation of the degree of coffee grinding, even if it is carried out automatically, is fixed, and is only based on the quality if coffee present inside the container. Furthermore, the probes and the electric and electronic filters are extremely sensible to even extremely small changes in environmental conditions such as temperature, humidity and, therefore, the system can become unreliable and not safe enough for the prefixed purposes. A further, not least, drawback is the total cost of the apparatus, because it implies that a large number of components, such as photocells, micro-switches, presence sensors, control and safety systems, actuator means, detectors of minimum and maximum (threshold) coffee levels, false alarm detectors, have to be assembled and are required to operate synchronously.

SUMMARY OF THE INVENTION

The purpose of the present invention is of providing an apparatus for coffee grinding and metering which obviates the above mentioned drawbacks; i.e., providing an electronic apparatus which secures an automatic regulation of the grinding degree based on coffee grinding unit operating parameters, as the wear of the coffee grinders over time.

Another purpose of the electronic apparatus according to the present invention is of allowing the exclusive use of a determined coffee brand preselected by the manufacturer and the user.

Another purpose of the electronic apparatus according to the present invention is of manufacturing the whole apparatus in a simple and cheap way, with no need for using complex and expensive technologies.

Such purposes are achieved by an electronic apparatus for coffee grinding and metering according to claim 1.

Advantageously, the electronic apparatus according to the present invention uses two disposable coffee containers corresponding to two different coffee brands, typically a classic taste blend and a strong taste coffee blend, each associated with a double conical coffee grinder, a magnetic card associated with the single coffee container, which activates the apparatus and performs the automatic regulation of the grinding parameters, based on used coffee brand and on operating variations, an electronic card to be entered into a cash terminal connected with the coffee grinding unit, suitable for coffee doses reservation by the customer.

Two electronic control cards, on reading the data contained in the magnetic and electronic cards, enable the coffee grinders to operate for a sufficient and necessary number of times for exactly exhausting that coffee amount which is present in each container and electronically regulate grinding as a function of the wear of the coffee grinders, and of used coffee brand.

BRIEF DESCRIPTION OF DRAWINGS

The features of the instant invention will be clearer from the following disclosure and accompanying drawings, which display an exemplifying embodiment discussed in order to illustrate the instant invention without limiting it. In the drawings.

DETAILED DESCRIPTION OF THE PREFERRED EMBODIMENTS

Figure 1:
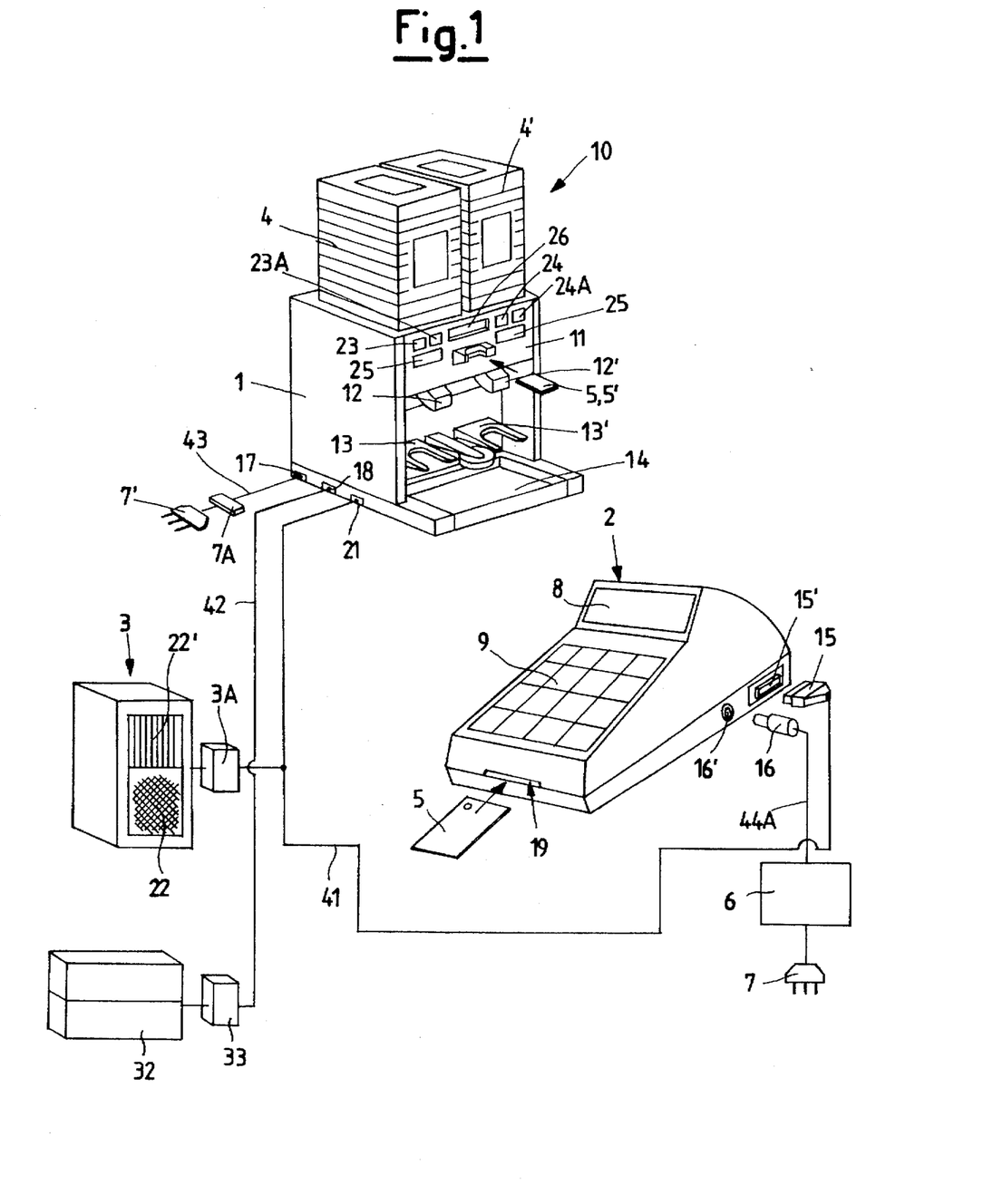
FIG. 1 shows an overall schematic view of the whole electronic apparatus according to the instant invention.
Figure 4:
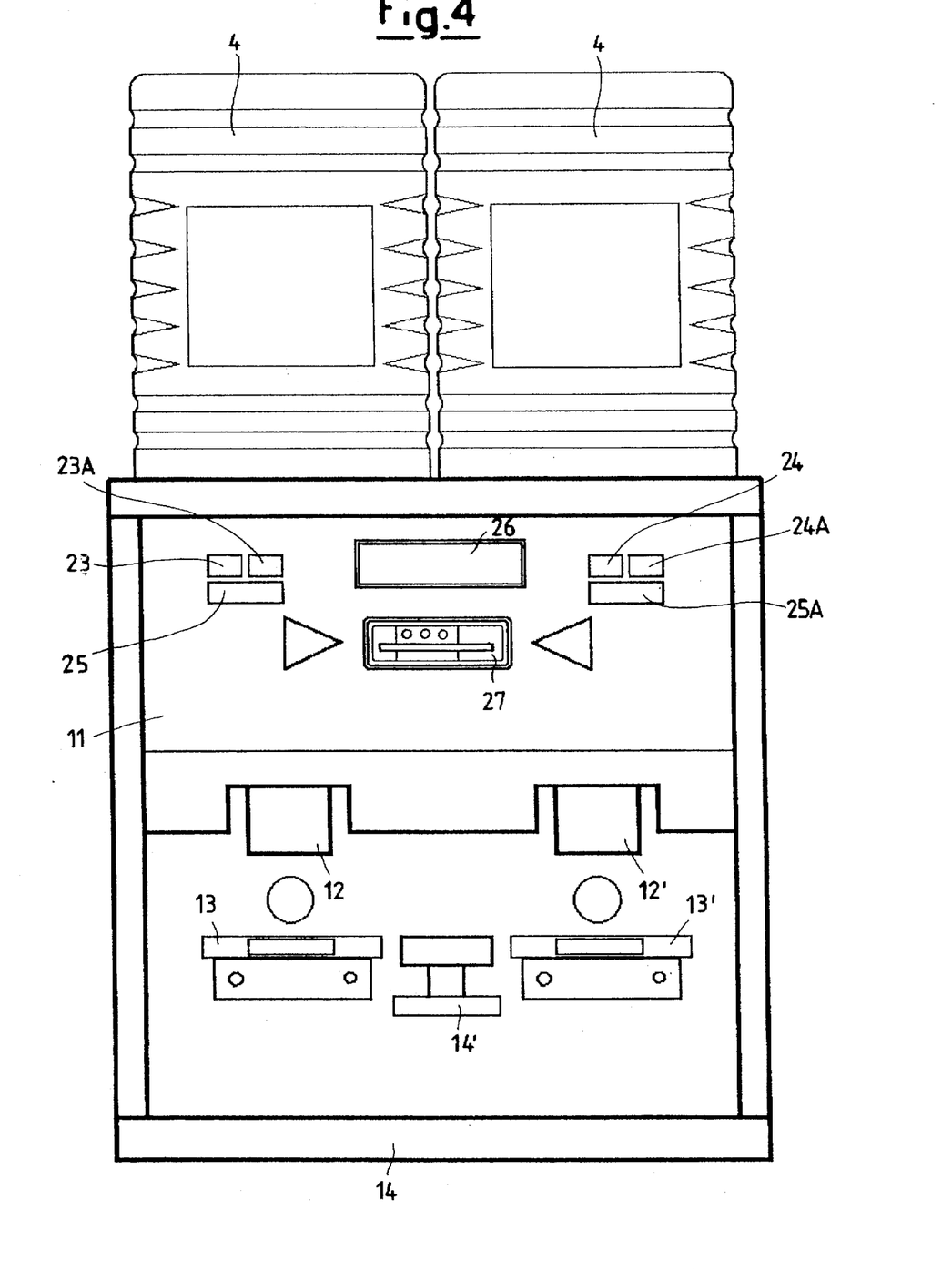
FIG. 4 shows a front view of the coffee grinding unit of FIG. 1.

Referring to FIGS. 1 and 4, the reference numeral (10) generally indicates the encasing structure of a coffee grinding machine generally indicated with (1), which makes a part of the electronic apparatus for coffee grinding/metering control according to the present invention. The reference numerals (4, 4') indicate both disposable coffee containers. They are made from a thermoplastic material and are provided with plastic plugs with valve. On the front panel (11) of the coffee grinding machine (1) the following are provided: four pushbuttons (23, 23A, 24, 24A) for manual coffee grinding regulation, two pushbuttons (25, 25A) for dispensing double coffee doses, a liquid crystal display (26)(LCD) for displaying the entered commands and the operating parameters of the coffee grinding machine (1), as well as a slot (27) into which the cards (5, 5') are entered.

The reference numerals (12, 12') indicate the supports for coffee dispensing filters, (13, 13') indicate the cup carriers, the reference number (14) indicates the bottom of the coffee grinding machine (1), used as a support base for cups, and (14') indicates the carrier for the coffee dispensing filter, used while the ground coffee blend is being charged.

The coffee grinding machine (1) is connected with the power supply system (57) (schematically indicated in FIG. 6) through the connector plug (7'), the power supply unit (7A) and the electrical line (43), which leads to the connector (17). Furthermore, the coffee grinding machine (1) is connected with a voice messages transmitter (3) comprising an amplifier (22') and a loudspeaker (22), through the power supply unit (3A), the serial line (of RS 485 type) (41) and the connector (21), and with a cash terminal (2), through the same serial line (41) and the connectors (21, 15, 15').

The reference numeral (21) indicates the connection connector installed on the coffee grinding machine (1), (15') indicates the connection connector installed on the cash terminal (2) and (15) indicates the connector plug. The coffee grinding machine (1) is furthermore connected with a light signboard (32) equipped with a power supply unit (33) which displays the operating status, showing which the coffee container (4, 4') is, which is being used at present and, therefore, the coffee blend brand which is being ground. The cash terminal (2) is connected with the power supply system (57) through the socket (7), the power supply unit (6), the electrical line (44A) and the connectors (16, 16'). The above said cash terminal (2) is furthermore provided with a liquid crystal display (8) for displaying the user messages, and an alphanumeric keypad (9).

Figure 2:
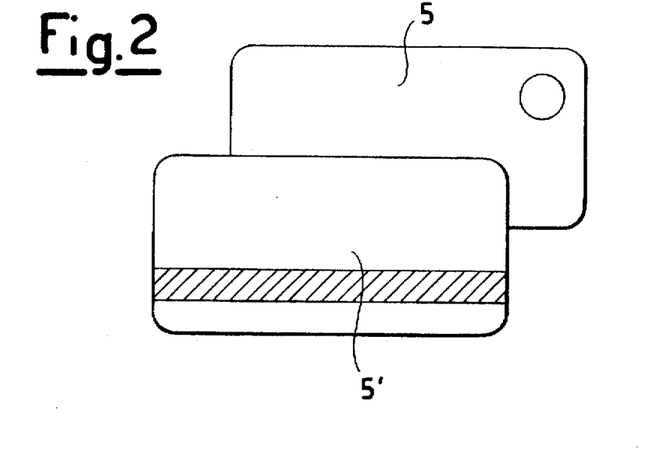
FIG. 2 shows the cards, of magnetic type and electronic type, respectively, which are entered into the coffee grinding unit and into the cash terminal.

Referring in particular to FIG. 2, the reference numerals (5, 5') indicate, respectively, an electronic card (made from a thermoplastic material and manufactured according to ISO standards), which is used by the customer in order to reserve one or more coffee grinding operation(s), or one single or double coffee dose, and a magnetic card (also made from a thermoplastic material and manufactured according to ISO standards), which is entered into the slot (27) of the coffee grinding machine (1) in order to perform the procedure of recognition of coffee containers (4, 4') and set the relevant operating parameters.

Figure 3:
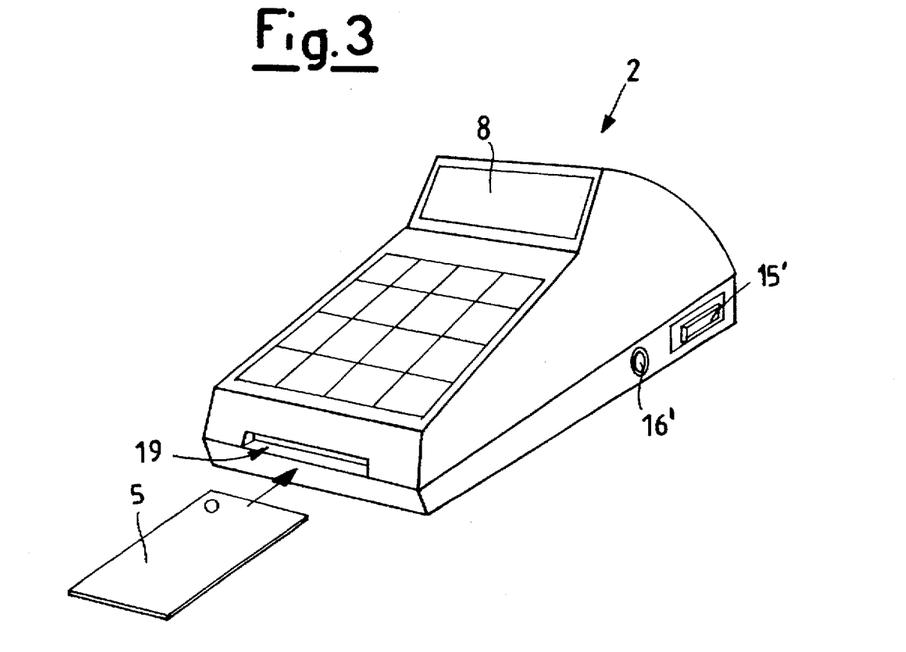
FIG. 3 shows an enlarged view in greater detail, of the cash terminal according to FIG. 1.

Referring in particular to FIG. 3, the reference numeral (19) indicates the slot into which the electronic card (5) is entered: this operation enables the grinding operations and/or the coffee doses to be reserved from a remote site thanks to the connection with the coffee grinding machine (1) by means of the serial line (41) and the exhausted cards (5) to be restored, suitable messages are displayed on the display (8) of the cash terminal (2) in order to keep the customer informed about the type of operations performed and the obtained results.

Figure 5:
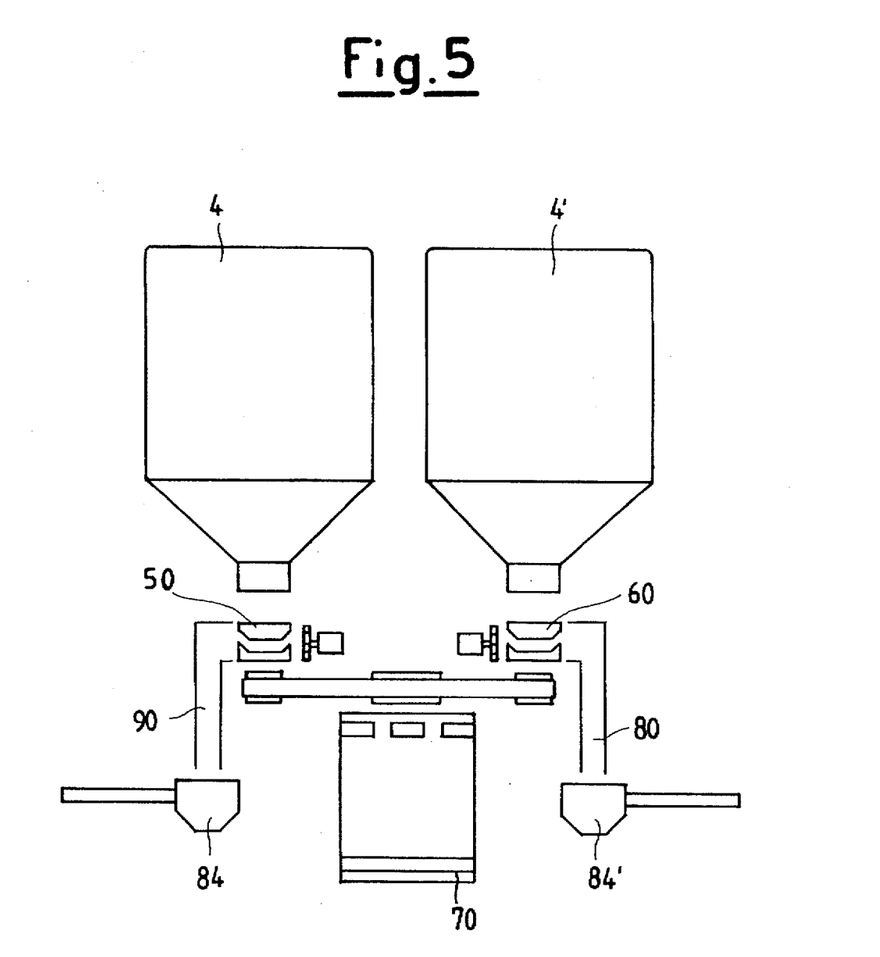
FIG. 5 shows a schematic view of the coffee grinding/metering system installed inside the coffee grinding unit of FIG. 1.

Referring in particular to FIG. 5, the reference numerals (30, 40) indicate both devices provided in order to regulate the grinding of the coffee contained in (4, 4'); the reference numerals (50, 60) indicate both double conical coffee grinders, one per each container (4, 4'), driven by the asynchronous motor (70). The reference numerals (80, 90) indicate the ground coffee guide ducts leading to the dispensing filters (84, 84').

Figure 6:
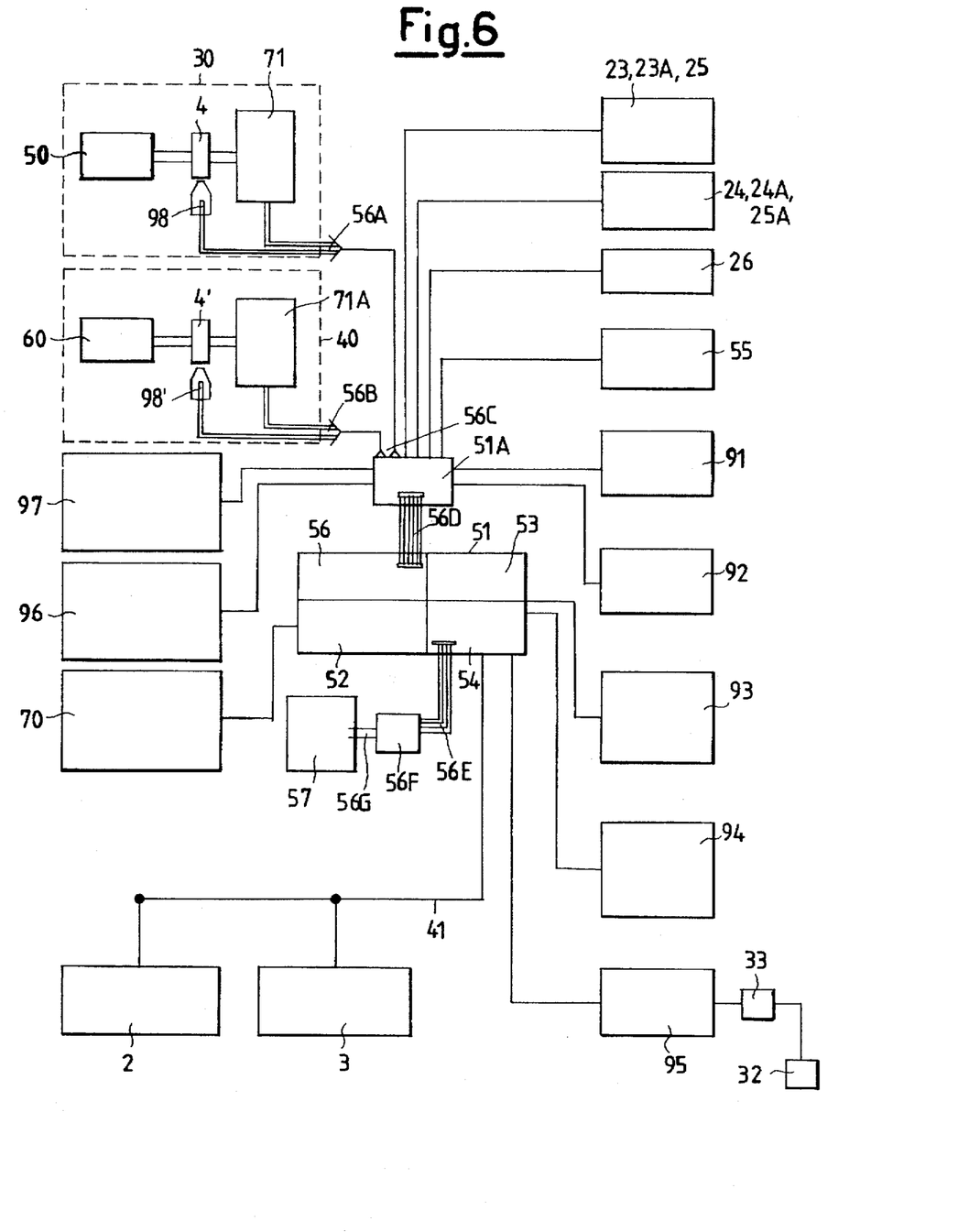
FIG. 6 illustrates, in a block diagram, electrical connections between the electronic control cards and the remainder portions of the apparatus.

In FIG. 6, the reference numerals (51, 51A) generally indicate two electronic control cards mutually connected by a digital bus 56D.

The electronic control card (51) comprises an 8-bit microprocessor (52) (for example, Intel's 80C32 microprocessor, already containing a RAM memory and input/output connections, can be used), two storage units (53, 54), with the one of them being a 32 kbytes EPROM memory and the other being a 2-Kbytes E$^2$PROM memory, and an transistor driver (56) for the asynchronous motor (70), of TRIAC type with electromechanical contact direction reversing system.

The data exchange between said electronic control card (51), the cash terminal (2) and the transmitter (3) takes place through the serial line (41). The electronic control card (51) is furthermore electrically connected with two presence sensors (93, 94), which detect the presence of the coffee dispensing filters (84, 84') (i.e., the right-hand side filter and the left-hand side filter) and with a light signboard (32) control/enabling block (95).

The digital bus (56E) supplies the necessary electrical power for electronic control card (51) operation which is derived from the power supply system (57), through the transformer (56F) and the electrical line (56G).

The electronic control card (51A) comprises an electronic system which controls two presence sensors (91, 92) used to detect the presence of coffee inside both coffee grinders (50, 60) (i.e., the left-hand side and right-hand side coffee grinders, respectively) and two zeroing sensors (96, 97) which detect the zeroing of the number of coffee grinding operations carried out by the right-hand side coffee grinder (60) and the left-hand side coffee grinder (50), respectively. The electronic control card (51A) is furthermore electrically connected with the magnetic (5') and electronic (5) card reading/writing device (55), with the display (26) and with the pushbuttons (23, 23A, 25 and 24, 24A, 25A) provided in order to allow the left-hand side coffee grinder (50) and the right-hand side coffee grinder (60), respectively, to be manually regulated.

The digital bus lines (56A, 56B, 56C) convey data and instructions from the electronic control card (51A) to the grinder means (30, 40) of the left-hand side coffee grinder (50) and the right-hand side coffee grinder (60), respectively. Each grinder means (30, 40) (i.e., the left-hand side and the right-hand side grinder means, respectively) comprises a grinder (50, 60), a ratiomotor (71, 71A) and an encoder (98, 98') which collects the data relevant to the coffee brand contained in the container (4, 4'). Those data are compared in the electronic control card (51A), which sends a certain instruction type to the ratiomotor (71, 71A), based on the result of said comparison.

The electronic apparatus according to the present invention operates as follows.

The containers (4, 4') are installed on the coffee grinding machine (1) to the left and to the right, respectively, relatively to an observer frontally looking at the coffee grinding machine (1); when the magnetic card (5') is entered into the slot (27), the coffee grinding machine (1) is enabled for the sufficient and necessary number of grinding operations to exhaust all coffee contained inside the coffee container (4) or (4'). This task is performed by the electronic control cards (51, 51A), by means of instructions sent through the digital bus lines (56D, 56C, 56B, 56A) to the coffee grinder means (30, 40) on the base of the data stored in storage means (53, 54) and of the reading performed by the reading/writing device (55). Now, the transmitter (3) informs on the occurred enabling by means of a voice message (for example, of the type: 'Congratulations, You've chosen a really excellent coffee brand!'), and the light signboard (32) displays the coffee brand which is being ground, signalling the container (4) or (4') which is being used. In this case, the electronic card (51) enables the connection with the serial line (41).

If a magnetic card (5') not corresponding to the container (4) or (4') is used, or if the card (5') is improperly orientated inside the slot (27), the coffee grinding machine (1) is not enabled to operate because the electronic card (51) detects a mismatch between data stored in storage means (53), 54) and the transmitter (3) sends a message informing upon the occurred mismatch. For example, the voice message generated by the transmitter (3) can be of the type: "Hallo friend, I don't know You. Who are You?". In this case, the light signboard (32) remains dark.

Under normal operation circumstances, the coffee grinding machine (1) is exclusively enabled to grind a single or double coffee dose by the electronic card (5) the storage of which contains data as to the coffee brand and tailored coffee doses for each user.

The electronic card (5) can be processes by the writing/reading device (55) of the coffee grinding machine (1), or by the writing/reading device (55) of the cash terminal (2). By sliding her/his electronic card (2) into the slot of the cash terminal (2), the user reserves at the coffee grinding machine (1) one or two coffee dose(s) which are automatically subtracted from the total number of pre-paid doses, originally stored on said card (5).

The exhausted electronic cards (5) can be replenished, still through the cash terminal (2), by entering them into the purposely provided slot (19) and operating on alphanumerical keyboard (9).

According to an alternative solution to cash terminal (2), the user may hand her/his electronic card (5) to the barman who will enable the coffee grinding operation by entering said card into the slot (27) of the coffee grinding machine (1). Also in this case, a voice message by the transmitter (3) can be provided, e.g., of the type: "Compliments, I'm preparing one–two doses of your outstanding coffee!" with the light signboard (32) being simultaneously lit.

When the container (4) or (4') is empty, the coffee grinding machine (1) is disabled and the container (4) or (4') can be replaced; the above steps will be repeated with a new container (4) or (4'), associated with a new magnetic card (5'), in order to be capable of enabling again the coffee grinding machine (1).

In a first generalization of the instant invention the mechanical units which constitute the coffee grinding machine (1) are, sequentially, two containers (4, 4') containing both coffee brands to be used, two grinders (50, 60) linked with two ratiomotors (71, 71A) associated to one single asynchronous motor (70), metering means (80, 90), means (84, 84') for coffee filtering and dispensing.

According to the prior art, the containers (4, 4') are of disposable type. They are furthermore closed and sealed, made of a cardboard or thermoplastic material and each of them is provided, at its bottom end, with a narrow opening arranged inside a connection means and guided, through side guides, into a housing seat associated with both grinders (50, 60).

At each connection means, sensor means (91, 92) verify the presence of coffees coming from the containers (4, 4') to the underlying grinders (50, 60).

The actuator means (56) of the motor (70) drives, through bearings, the motion of a crown gear and of a gear wheel, respectively of the left-hand grinder (60) or the right-hand grinder (50), according to the position of the electromechanical-contact direction-exchange device such that, in the first case, the grinding is enabled of coffee contained inside the left-hand container (4) (e.g., the classic-taste coffee blend) and, in the second case, the grinding is enabled of coffee contained inside the right-hand container (4) (e.g., the strong-taste coffee blend), according to user's requirements.

Additionally, each crown gear regulates the mutual position of a conical pair which constitutes the true grinder (50, 60) (which is a double conical grinder).

Under the grinders (50, 60) means (80, 90) are provided for metering coffee: in particular, at the outlet from each double conical pair, a duct (80, 90) is provided which receives ground coffee and guides it to a tank, installed above a buffer, in order to deliver the coffee dose to be used to the dispenser filter (84, 84').

Sideways to each tank there are provided sensor means (91, 92) which detect the presence of ground coffee inside a pre-established region between a minimum level and a maximum level and consequently send the motor (70) starting or stopping command.

Other sensor devices (93, 94) detect the presence of the dispenser filters (84, 84') in coffee charging and dispensing position.

Inside the storage units (53, 54) of the electronic card (51) some operating parameters are stored, such as the number of grinding operations carried out by the right-hand grinder (60) and the number of grinding operations carried out by the left-hand grinder (50), so that the electronic regulation of the grinding degree may take into account not only the data on coffee blend (already stored on the magnetic card 5'), but also of the wear of grinding edge of grinders (50, 60) over time.

Based upon the instructions sent by the electronic cards (51, 51A), the adjustment of the grinders takes place by separately piloting the right-hand and left-hand adjustment means (40) and (30), respectively. In practice, said adjustment means (30, 40) move the elements which compose the conical pair—which constitutes the true grinder (50, 60), approaching them to, or moving them apart from, each other.

Finally, the electronic control cards (51, 51A) can interpret recognition elements provided to identify the coffee container (4, 4') which are stored on the magnetic card (5'), through the reading/writing device (55).

Coffee grinding takes place hence automatically in order to compensate for the wear of the grinding edge of the grinders (50, 60) over time and in order to preset the optimal grinding degree based on preselected coffee blend. However, the grinding degree can also be regulated manually, by acting on pushbuttons (23, 23A, 24, 24A): in that way, the barman is given the possibility of varying said grinding degree within a very narrow range of positive or negative values around a reference position automatically preset for that particular coffee type, in order to be able to compensate for any possible changes in room temperature or inner moisture content.

Furthermore, according to the embodiment of the electronic apparatus disclosed according to the instant invention, as recognition elements for the identification of the preselected coffee brand, or of the doses reserved by the users, there can be used electrical inductance and capacitor filters, electronic filters, bar codes.

Finally, timer means could be used either in the coffee grinding machine (1) or directly on the magnetic cards (5, 5') which would cancel or turn into ineffective said recognition elements, after a predetermined time period.

From the above disclosure, the characteristics will be clear of the electronic apparatus for coffee grinding and metering control according to the present invention as well as the advantages thereof will be clear.

In particular, they are represented by:
the operating mode of the electronic apparatus according to the present invention prevents any tampering of coffee containers, thus allowing the quality of the product contained inside them to be guaranteed;
the apparatus renders extremely easy any necessary interventions for grinding to operate in optimal way, e.g., by allowing the optimal enabling of the double conical grinder, the automatic/manual regulation of coffee grinding, coffee doses selection, the help by sound and visual messages on the operating status;
a cash terminal associated with the coffee grinding machine gives the user/client the possibility of reserving, through cards of electronic type, one or more coffee grinding operations, or of having a single or double coffee dose dispensed, or the exhausted cards replenished.

Finally, changes can be supplied to the embodiments of the invention illustrated above without departing from the principles which are the base of the innovative idea; as well as, when practicing the innovation, materials and dimensions may be selected according to technical requirements.

I claim:

1. Electronic apparatus for coffee grinding and metering control of the type containing, within an encasing structure:

at least one disposable coffee container;

a coffee grinding machine, constituted by:
   means for coffee grinding;
   means for coffee metering;
   means for filtering and dispensing coffee doses;

at least one support means for coffee cups;

at least one support means for said means for coffee doses filtering and dispensing;

one front covering panel;

at least one connector means for connecting the apparatus with the electrical system, through an electrical line and through at least one power supply;

means to enable the coffee grinding machine in the presence of elements of recognition of said container, wherein said recognition elements are stored on physical storage supports in order to store data;

said electronic apparatus furthermore comprising:

at least one voice message transmitter equipped with an amplifier and a loudspeaker connected, through at least one connector means, at least one first power supply device and an electrical line, with said coffee grinding machine, with said transmitter device issuing messages relevant to the operative status of said coffee grinding machine, in particular communicating the successful recognition, or less, of said container;

a plurality of display devices displaying the operating status of the electronic apparatus, connected with said coffee grinding machine;

characterized in that said enabling means for said coffee grinding machine comprise at least a first and a second electronic control cards connected with each other through a digital bus which, when a first physical support for data storage is entered into a slot provided on said front panel in such a way that the data stored on said first physical storage support are processed by a reading/writing device of the coffee grinding machine, they enable said coffee grinding means for a sufficient and necessary number of times for exhausting that amount of coffee which is present inside said container, as a function of the quality of coffee to be ground and as a function of the wear of said grinding means over time, and store in their memory the number of grinding operations carried out, said coffee container being univocally associated with said first physical support, said first physical support containing, stored in its memory, the data relevant to the organoleptic characteristics of coffee contained inside said container.

2. Electronic apparatus for coffee grinding and metering control according to claim 1, characterized in that said first electronic control card comprises a microprocessor connected with a plurality of storage devices and a TRIAC transistor driver for a motor means, said driver comprising an electromechanical-contact direction-reversing system suitable for driving said grinding means to operate alternatively, said first electronic control card being powered with power derived from said electrical power supply system through a transformer, a digital bus and an electrical line, said first electronic control card furthermore enabling sensor devices which detect the presence of said means for coffee filtering and dispensing in their coffee charging position and driving said transmitter device through a serial line and at least one from said display devices based on the data which said first and said second electronic control cards and, respectively, receive from said reading/writing device of the coffee grinding machine.

3. Electronic apparatus for coffee grinding and metering control according to claim 2, characterized in that said display devices which display the operating status of said electronic apparatus comprise a liquid crystal display installed, together with an alphanumerical keyboard, on a cash terminal, which is enabled to reserve one or two coffee grinding operations and a single or double coffee dose, by means of a second physical support for data storage, which second physical support is entered into a slot purposely provided on said cash terminal, so that the data contained on said second physical support may be processed by a reading/writing device which is provided at said cash terminal, said second physical support for data storage being univocally associated with each individual coffee consumer, and containing information relevant to a preestablished number of single or double coffee doses reservations, said cash terminal being additionally connected, through said serial line, and at least one connector with said first electronic control card of said coffee grinding machine and connected, through an electric line, at least one second power supply device and at least one connector with the electrical power supply system.

4. Electronic apparatus for coffee grinding and metering control according to claim 1, characterized in that said first physical support for data storage is a magnetic card.

5. Electronic apparatus for coffee grinding and metering control according to claim 3, characterized in that said second physical support for data storage is a card of electronic type comprising at least one solid-state device.

6. Electronic apparatus for coffee grinding and metering control according to claim 1, characterized in that said display devices designed to display the operating status of said electronic apparatus comprise at least one light signboard connected, through said electric line and at least one third power supply device, with said coffee grinding machine.

7. Electronic apparatus for coffee grinding and metering control according to claim 6, characterized in that said light signboard displays what coffee container is being used and, therefore, what coffee brand is due to be ground.

8. Electronic apparatus for coffee grinding and metering control according to claim 5, characterized in that said reading/writing device for reading/writing said electronic type card is used in order to reload said card when on said card said prefixed number of reservations is exhausted, owing to readings carried out inside said reading/writing device of said cash terminal.

9. Electronic apparatus for coffee grinding and metering control according to claim 5, characterized in that said electronic type card is entered into said slot of said front panel of said coffee grinding machine in order that the contained data is processed by said reading/writing device installed inside said coffee grinding machine.

10. Electronic apparatus for coffee grinding and metering control according to claim 2, characterized in that said grinding means comprise:

two disposable coffee containers made from a thermoplastic material, each provided with a cap of plastic material, with valve;

two double conical grinders driven by said motor means;

two ratiomotor devices linked with said conical grinders; and said containers;

two decoding devices which signal the presence and the organoleptic qualities of coffee contained inside the containers;

said ratiomotor devices and said decoding devices being driven, through a plurality of digital bus means by said second electronic card, according to instructions and data which are supplied to said electronic card by said reading/writing device, a plurality of sensor devices which detect the presence of coffee in the grinders and a plurality of suitable means for resetting the number of grinding cycles performed by said conical grinders.

11. Electronic apparatus for coffee grinding and metering control according to claim 3, characterized in that said means for coffee metering comprise two ducts for ground coffee, each of which supplies the mix to each of said means for coffee doses filtering and dispensing.

12. Electronic apparatus for coffee grinding and metering control according to claim 10, characterized in that coffee grinding takes place separately for each of said conical grinders.

13. Electronic apparatus for coffee grinding and metering control according to claim 4, characterized in that coffee grinding takes place automatically when said magnetic card is slid into said slot of the front panel of the coffee grinding machine.

14. Electronic apparatus for coffee grinding and metering control according to claim 1, characterized in that said front panel comprises:

at least one display device designed to display messages informing on the operating status of said coffee grinding machine;

means for manual dispensing double coffee doses;

means for manually varying the coffee grinding degree within a predetermined range of values, said range comprising the value corresponding to the coffee grinding degree automatically present by the apparats for that particular coffee brand used inside said containers, said display device, said means for manual dispensing double coffee doses and said means for manually changing coffee grinding degree being connected with said second electronic card.

15. Electronic apparatus for coffee grinding and metering control according to claim 10, characterized in that coffee grinding takes place by causing the distance between two elements of a pair of conical grinder means to change, with each of said conical grinders being constituted by said conical pair.

16. Electronic apparatus for coffee grinding and metering control according to claim 2, characterized in that in said storage devices of said first electronic card data are stored which correspond to the number of grinding cycles individually carried out by each of said conical grinders.

17. Electronic apparatus for coffee grinding and metering control according to claim 3, characterized in that said first and second physical storage supports for data storage are made of thermoplastic material, according to Italian national and international ISO standards.

18. Electronic apparatus for coffee grinding and metering control according to claim 2, characterized in that said serial line is of RS 485 type.

19. Electronic apparatus for coffee grinding and metering control according to claim 2, characterized in that said microprocessor is of Intel 80C32 type, comprising, inside it, a RAM memory and inlet/outlet connections.

20. Electronic apparatus for coffee grinding and metering control according to claim 2, characterized in that said storage devices are constituted by a 32 Kbytes EPROM memory and a 2 Kbytes E$^2$PROM memory.

* * * * *